United States Patent [19]

Miyoshi et al.

[11] Patent Number: 4,995,199
[45] Date of Patent: * Feb. 26, 1991

[54] MAGNETIC TAPE CASSETTE HAVING IMPROVED GUIDE POLE STRUCTURE

[75] Inventors: Takahito Miyoshi; Minoru Kanazawa; Tsutomu Sugisaki; Takuzi Yamada; Yasutoshi Okuzawa, all of Kanagawa, Japan

[73] Assignee: Fuji Photo Film Co., Ltd., Minami-Ashigara, Japan

[*] Notice: The portion of the term of this patent subsequent to Feb. 19, 2008 has been disclaimed.

[21] Appl. No.: 452,654

[22] Filed: Dec. 19, 1989

Related U.S. Application Data

[62] Division of Ser. No. 205,759, Jun. 13, 1988, Pat. No. 4,930,032.

[30] Foreign Application Priority Data

Jun. 15, 1987 [JP] Japan .............................. 62-90717[U]
Jun. 26, 1987 [JP] Japan .............................. 62-97437[U]

[51] Int. Cl.⁵ .................................................. B24B 1/00
[52] U.S. Cl. ......................................... 51/326; 29/603
[58] Field of Search ..................... 51/289 R, 318, 326; 29/603

[56] References Cited

U.S. PATENT DOCUMENTS 3,648,361  3/1972  Yagi et al. ........................ 51/326 X
4,837,923  6/1989  Brar et al. ........................ 51/326 X Primary Examiner—James G. Smith
Attorney, Agent, or Firm—Sughrue, Mion, Zinn, Macpeak & Seas

[57] ABSTRACT

A magnetic tape cassette having a guide pole which is in sliding contact with the magnetic surface of the tape produced in such a manner as to improve the running characteristics of the tape while being capable of being manufactured at a low cost. A cylindrical stainless steel base member is subjected to a barreling treatment so as to secure fine particles of an inorganic material having a Moh's hardness of greater than 9 to the slide surface of the guide post. Moreover, the surface of the guide pole can be finished by a surface rolling to reduce the number of scratch-like grooves in the slide surface having a depth of more than 0.2 μm and a width of less than 40 μm to less than 11 per millimeter in the sliding direction of the tape.

5 Claims, 2 Drawing Sheets

|←150 μm→|

|←150 μm→|

MAGNETIC TAPE CASSETTE HAVING IMPROVED GUIDE POLE STRUCTURE

This is a division of application Ser. No. 205,759, filed June 13, 1988, now U.S. Pat. No. 4,930,032.

BACKGROUND OF THE INVENTION

The present invention relates to a magnetic tape cassette, particularly, to a magnetic tape cassette used in a VTR (video tape recorder) or the like.

A variety of magnetic tape cassettes, including those of the Beta and VHS type, are known for use in VTRs or the like. The conventional cassettes all employ the same basic structure. FIG. 1 shows, as an example, a cassette of the VHS type. The magnetic tape cassette of FIG. 1 includes a tape guiding structure such as cylindrical tape guides 13, a guide pole 14, a guide roller 15, and a pressure pad 16 which cooperate to guide a magnetic tape T in running between a supply reel 11 and a take-up reel 12.

The sliding characteristics of the magnetic tape on these guide members greatly affect the tape running characteristics. This can be readily understood from the fact that the magnet tape T is manufactured by forming a magnetic layer on a flexible film support made of acetate, polyester, or vinyl chloride, as is well known in the art. To increase the total recording and playing time of the tape, or to improve the electromagnetic properties of the tape, a thinner tape having a high surface smoothness has been developed.

To take advantage of the improved sliding properties of such a tape, it is necessary to improve the surface smoothness of the above guide members. That is, as the thickness of the magnetic tape is reduced, its rigidity is decreased, and therefore the running characteristics of the tape are more strongly affected by the guide members. In the case of a tape used for recording and reproducing data at a high recording density, even slight variations in the behavior of the magnetic tape can strongly affect the recording and reproducing operations carried out with the tape. For example, variations in the behavior of the tape running can result in a jitter phenomenon, making the reproduced picture waver in the horizontal direction. Accordingly, it is essential to make the tape run smoothly.

The inventors have conducted intensive research into the above-described problems and found that variations in the running characteristics of the tape are largely attributable to the guide members which are in contact with the magnetic layer of the tape, namely, the guide pole 14 as shown in the example of FIG. 1, and to the surface characteristics of the tape itself. For instance, a tape with a magnetic surface having an Ra value of less than 0.01 $\mu$m (cut-off value of 0.25 mm) is more likely to have adversely affected tape running characteristics.

Thus, the above-described drawbacks may be eliminated with the provision of a guide pole 14 (with which the surface of the magnetic layer of the tape is brought into contact) which is made harder than a conventional guide pole and which is polished or subjected to other surface treatment so as to improve its surface smoothness. On the other hand, such techniques significantly increase the manufacturing cost of the guide pole, making the guide pole impractical for ordinary manufacturing use.

SUMMARY OF THE INVENTION

Accordingly, it is an object of the present invention to provide a magnetic tape cassette having a guide pole contacting the magnetic layer of the tape contained in the cassette which allows the tape to run smoothly, but which can be manufactured at a low cost.

The foregoing and other objects of the present invention have been met by the provision of a magnetic tape cassette having a guide pole which contacts the magnetic surface of the tape contained in the cassette in which, in accordance with the invention, the surface of the guide pole is machined to a predetermined surface roughness.

For this purpose, in the magnetic tape cassette of the present invention, inorganic particles having a Moh's hardness of 9 or greater are adhered to the surface of the guide pole. Also, the surface of the guide pole can be machined and finished so that the number of fine grooves of depth 0.2 $\mu$m or greater and width 40 $\mu$m or greater formed in the surface of the guide pole and extending in the sliding direction of the tape on the surface of the guide pole is not more than ten per millimeter.

The nature, principle and utility of the present invention will become more apparent from the following detailed description read in conjunction with the accompanying drawings.

DESCRIPTION OF THE PREFERRED EMBODIMENTS

Preferred embodiments of the present invention will now be described with reference to the accompanying drawings.

Figure 1:
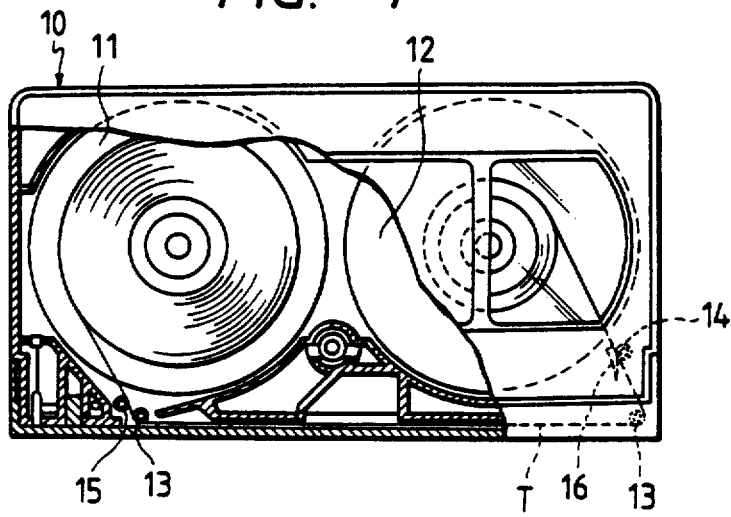
FIG. 1 is a plan view, with parts cut away, showing an example of a conventional magnetic tape cassette.
Figure 2:
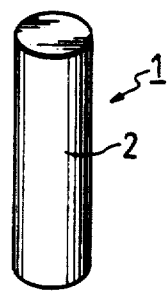
FIG. 2 is a perspective view showing a guide pole used in the magnetic tape cassette, which guide pole is constructed in accordance with a first embodiment of the present invention.

FIG. 2 shows a guide pole produced in accordance with a first embodiment of the invention. The guide pole 1 may be employed, for example, in the magnetic tape cassette 10 as shown in FIG. 1, and it has the same dimensions as the guide pole 14 seen in FIG. 1.

The guide pole 1 is manufactured by the following process:

A cylindrical stainless steel body having substantially the same dimensions as the desired guide pole is subjected to centerless grinding to roughen its surface. The centerless grinding operation machines the cylindrical stainless steel body to desired dimensions while forming fine grooves appearing as scratches in the cylindrical surface extending in the circumferential direction. The grindstone used in the centerless grinding operation should generally have a roughness in a range of No. 100 to No. 140. In selecting a grindstone of appropriate roughness, not only the time required for grinding the raw cylindrical body, but also the grade of a barrel finishing described below should be taken into consideration.

Thereafter, the surface of the guide pole 1 is finished by barrel finishing. In the barreling operation, the centerless-ground guide pole is rotated together with an abrasive such as aluminum oxide particles (spherical shape, 1 μm to 2 mm diameter) or silicon carbide particles and ceramic balls (2.5 mm diameter) in a closed container. During the barreling operation, the abrasive particles rub and strike against themselves and the guide pole 1 in the container, thus becoming smaller and smaller.

In the barreling operation, the surface of the guide pole 1 is finished with aluminum oxide particles to provide a considerably smooth surface 2, while simultaneously the aluminum oxide particles secured themselves to the surface 2 are implanted therein. That is, during the barreling operation, the rubbing of the guide pole 1 against the balls and/or other guide poles being simultaneously processed allows the aluminum oxide particles 3 to finish the surface 2 of the guide pole and also causes some of the aluminum oxide particles to become fixed to the surface 2 in such a manner as to fill in minute concave portions of the surface 2. These aluminum particles form a part of the material of the guide pole 1 and cannot be dislodged by external forces applied to the pole 1 when in use, that is, they are positively held as part of the surface 2 of the guide pole 1. The aluminum oxide particles which secure themselves to the minute concave parts of the surface 2 of the guide pole are those which have been pulverized to a diameter less than the width of the minute concave parts, for example, about 3 μm.

Figure 3:
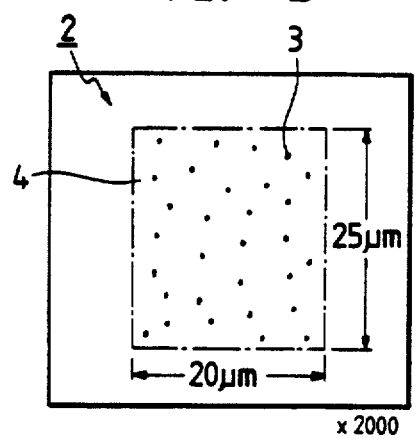
FIGS. 3 and 4 are diagrams showing electron microscopic photographs of the surface of a guide pole in a magnetic tape cassette constructed in accordance with a first embodiment of the present invention.
Figure 4:
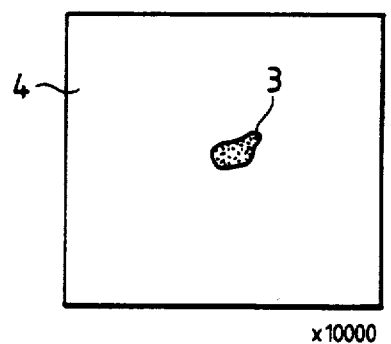

The aluminum oxide particles 3 secured to the surface 2 of the guide pole 1 are as shown in FIGS. 3 and 4, which are diagrams depicting microscopic photographs taken of such a guide pole 1. The magnification in FIG. 3 is 2,000, while in FIG. 4 the magnification is 10,000.

The distribution of the aluminum oxide particles 3 is such that, as shown in FIG. 3, each 25 μm by 20 μm area on the surface 2 contains about 15 or 16 particles 3. The distribution and the securing of the aluminum oxide particles can be suitably controlled, for instance, by selection of the barreling time and by selection of the size of the ceramic balls.

The surfaces of the aluminum oxide particles secured to the surface 2 of the guide pole forming parts of the surface 2 of the guide pole 1 are flat, as is apparent from FIG. 4. This is due to the fact that the surfaces of the adhering aluminum oxide particles are flattening during the barreling operation. The smoothness of the surface 2 may be substantially the same as that of a conventional guide pole. For example, it is preferable that, with a cut-off value of 0.08 mm, the Ra value is of the order of 0.01 to 0.05 μm.

As described above, the aluminum oxide particles, which are inorganic particles having a Moh's hardness greater than 9, are suitably distributed on the surface 2 of the guide pole 1 in such manner as to form integral parts of the surface 2, and the roughness (alternately, smoothness) of the surface 2 is equal to or greater than that of a conventional guide pole. As a result, the frictional resistance between the guide pole 1 and the magnetic surface of the tape is held to a small value.

The reason for this is considered to be as follows: Because, the surface 2 of the guide pole 1 of the present invention includes hard particles as described above, the effective hardness of the surface becomes the hardness of the particles, with the result that the wear resistance of the guide pole is significantly improved. Moreover, the effective contact surface with the magnetic surface of the tape is the portions where the tape contacts the particles, rather than the other material of the guide pole. Hence, the effective contact area between the magnetic surface of the tape and the guide pole is substantially reduced, and accordingly the frictional resistance between the tape and the guide pole is reduced.

In the above-described embodiment, aluminum oxide particles are employed as the inorganic particles, but the intention is not limited to the use of this material. That is, other particles having a Moh's hardness greater than 9, such as silicon carbide particles, can also be used.

As described above, in the first embodiment of the present invention, inorganic particles having a Moh's hardness greater than 9 are adhered to the surface of the guide pole on which the magnetic surface of the magnetic tape contained in the cassette slides, whereby the wear resistance of the guide pole is increased and the slide resistance of the magnetic tape accordingly decreased. Furthermore, the use of aluminum oxide particles or the like provides substantially the same effect as an oxide film, with the result that excellent tape running characteristics can be maintained over long periods of use, and jitter and tape jamming substantially prevented.

The guide pole according to the present invention can be manufactured with a very simple manufacturing process such as a barreling method. As a result, a magnetic tape cassette having excellent data recording and reproducing characteristics can be obtained at a low cost with the use of the invention.

Conducive to a complete understanding of the present invention, specific examples thereof will be described.

EXAMPLE 1

VHS magnetic tape cassettes, "S-MASTER", manufactured by Fuji Photo Film Co., Ltd., were used for the tests.

Guide poles having a cylindrical shape with a diameter of 2.5 mm, as shown in FIG. 3, were formed as follows: A cylindrical stainless steel body of appropriate shape containing 65 to 75% Fe, 15 to 20% Cr, and 10 to 15% Ni by weight was provided, and aluminum oxide particles, silicon carbide particles, and $Cr_2O_3$ particles were used as the inorganic particles having a Moh's hardness of 9 or higher. The average particle size of the inorganic particles was in a range of 0.1 μm to 0.5 μm. The distribution of the inorganic particles was such that, similar to the case of FIG. 3 discussed above, five to 30 particles were present in each 25 μm by 20 μm area. Moreover, also similar to the above-described embodiment of the present invention, the inorganic particles were adhered to the surfaces of the guide poles by barrel finishing.

With respect to the smoothness of the surfaces of the guide poles, the Ra value was in a range of 0.03 μm to 0.04 μm, with the cut-off value being 0.08 mm.

As a comparison, guide poles were produced using inorganic particles having a Moh's hardness of 8 or less.

The results of the evaluation of the magnetic tape cassettes of the above examples are listed in Table 1 below:

TABLE 1

| Sample No. | Inorganic Particles | Moh's Hardness | Evaluation (Occurrence of Jitter) |
| --- | --- | --- | --- |
| 1 | aluminum oxide ($Al_2O_3$) | 9 | OO |
| 2 | ilicon carbide (SiO) | 9 | O |
| 3 (Compar.) | topaz ($SiO_4$) | 8 | X |
| 4 (Compar.) | quartz ($SiO_2$) | 7 | XX |

In Table 1, the evaluation was carried out as follows: With the temperature held at 5° C. and the relative humidity at 80%, a data recording and reproducing device, Model VTRG-21, manufactured by Matsushita Denki Co., Ltd., and a jitter meter, Model MK-611A, produced by Meguro Dempa Co., were used to measure the amount of jitter. When the amount of jitter was less than 0.10 μsec., such is indicated in Table 1 by "OO", when the amount of jitter was larger than 0.10 sec. (inclusive) and smaller than 0.15 μsec., an indication of "O" is employed, when the amount of jitter was larger than 0.15 μsec. (inclusive) and smaller than 0.20 μsec., such is shown by a mark "X", and when larger than 0.20 μsec. (inclusive), a mark of "XX" is shown.

As is apparent from Table 1, in the case where the inorganic particles had a Moh's hardness of 9 or higher, the resultant picture reproduced from the tape was substantially free from jitter. On the other hand, as the Moh's hardness was reduced to less than 9, jitter appeared. That is, the effect is significantly different when particles having a Moh's hardness of 9 or greater were employed.

A second embodiment of the invention will now be described.

In the second embodiment of the present invention, the guide pole is subjected to centerless grinding and barrel finishing, similar to the case of the first-described embodiment of the present invention. Thereafter, the guide pole is subjected to surface rolling. The small convex parts remaining on the surface of the surface of the barreled guide pole are flattened by the surface rolling operation. This surface flattening operation is carried out beginning with the smallest of the fine groove-like scratches formed in the centerless grinding operation and which are left after the barrel finishing.

Figure 5:
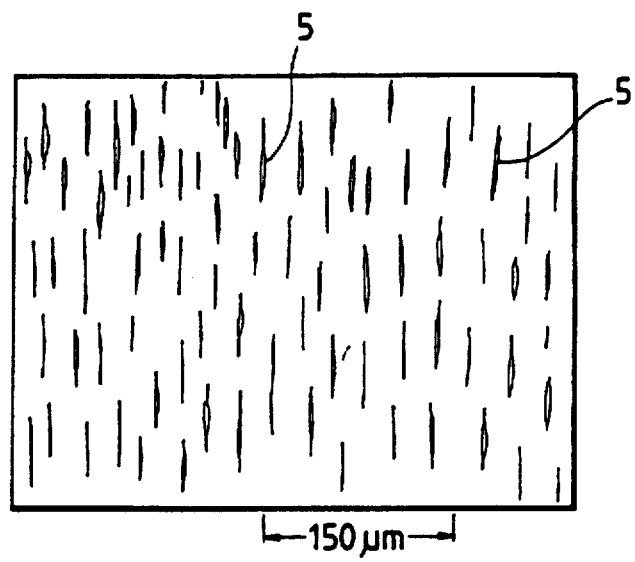
FIG. 5 is a diagram showing optical microscopic photograph of the surface of a guide pole in a magnetic tape cassette prior to surface rolling.
Figure 6:
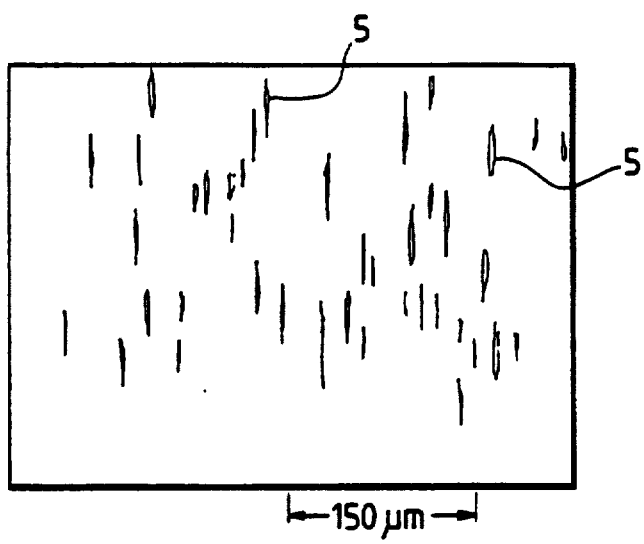
FIG. 6 is a diagram showing the same surface as that of FIG. 5 after surface rolling.

FIG. 5 shows the surface 2 of the guide pole 1 prior to surface rolling, and FIG. 6 shows the same surface after surface rolling. In FIGS. 5 and 6, the optical microscopic photographic magnification is 200. As is apparent from FIGS. 5 and 6, the number of scratch-like grooves 5 in the surface 2 of the guide pole is considerable reduced by barrel finishing; that is, the surface 2 is made considerably smooth.

The roughness of the surface 2 after being subjected to barrel finishing was measured by moving a measuring stylus along the guide pole in the longitudinal direction so as to measure the surface roughness in terms of up and down movement of the stylus.

In the second embodiment of the present invention, the surface 2 of the guide pole 1 is barreled and surface finished until the number of scratch-like grooves 5 having a depth of more than 0.2 μm and width of less than 40 μm was ten or less per millimeter in the longitudinal direction of the guide pole 1, that is, in the widthwise direction of the magnetic tape. If the number of grooves 5 is more than ten per millimeter, then, when the guide pole is used with a magnetic tape having a magnetic surface with a smoothness of less than 0.01 μm, the tape running behavior becomes unstable, as a result of which jitter can frequently occur.

If, on the other hand, the surface 2 of the guide pole 1 has a mirror finish, the a magnetic tape having a very smooth magnetic surface will tend to stick to the surface of the guide pole, thus greatly increasing the amount of frictional resistance and degrading the tape running characteristics.

As described above, in accordance with the second embodiment of the present invention, the surface of the guide pole which is in sliding contact with the magnetic surface of the magnetic tape is formed in such a manner that the number of scratch-like grooves having a depth of more than 0.2 μm and a width of less than 40 μm in the direction of sliding of the magnetic tape is not more than ten per millimeter. As a result, in the magnetic tape cassette of the present invention, the magnetic tape is substantially free, for example, from oscillatory movement caused by the surface roughness of the guide pole. Hence, the magnetic tape cassette provides excellent recording and reproduction characteristics being free, for example, from jitter.

Conducive to a full understanding of this embodiment of the present invention, specific examples of the second embodiment will be described.

EXAMPLE 2

VHS magnetic tape cassettes, "S-MASTER", manufactured by Fuji Photo Film Co., Ltd., and magnetic tapes whose surface Ra value (cut-off value 0.25 mm) was 0.009 μm were used for the tests.

Cylindrical guide poles as shown at 2 in the above-discussed drawings and having a diameter of 2.5 mm were formed by the following process: A stainless steel body of appropriate shape containing 65 to 75% Fe, 15 to 20% Cr, and 10 to 15% Ni by weight was provided. Grindstones used in centerless grinding of the guide poles had a roughness of No. 120. The abrasives used in the barrel finishing of the guide poles were aluminum oxide particles having an average particle size of 1.5 mm.

A plurality of guide poles were manufactured under these specifications with processing conditions such as barrel finishing time varied. All specimens were surface rolled. The guide poles thus manufactured were measured for scratch-like grooves in the sliding direction of the magnetic tape, and observations of picture jitter for each were carried out.

The specimens were measured and a surface roughness pattern chart formed by measuring a predetermined part of length 1.6 mm with a constant stylus pressure of 0.4 gf with a diameter of 5 μm and measuring speed of 0.06 mm/sec, with a chart speed being set at 15 mm/sec and with a magnification of 50,000:1 in the direction of the depth.

As a result, it was found that almost all specimens had fine groove less than 0.2 μm in depth, which is advantageous since jitter arises primarily for the case where the grooves are deeper than 0.2 μm and have a width of less than 40 μm.

The results of these measurements are presented in Table 2 below:

TABLE 2

| Specimen No. | Grooves per mm | Groove Depth (μm) | Groove With (μm) | Evaluation (Jitter) |
| --- | --- | --- | --- | --- |
| 1 | 2 | 0.2 | 20 | OO |
| 2 | 5 | 0.2 | 20 | OO |
| 3 | 6 | 0.2 | 50 | X |
| 4 | 9 | 0.4 | 40 | O |
| 5 | 10 | 0.2 | 40 | O |
| 6 | 13 | 0.2 | 20 | X |
| 7 | 20 | 25 | 50 | X |

In Table 1, the evaluation was carried out as follows: With the temperature held at 5° C. and the relative humidity at 80%, a data recording and reproducing device, Model VTRG-21, manufactured by Matsushita Denki Co., Ltd., and a jitter meter, Model MK-611A, produced by Meguro Dempa Co., were use to measure the amount of jitter. When the amount of jitter was less than 0.10 μsec., such as indicated in Table 1 by "OO", when the amount of jitter was larger than 0.10 μsec. (inclusive) and smaller than 0.15 μsec., an indication of "O" is employed, when the amount of jitter was larger than 0.15 μsec. (inclusive) and smaller than 0.20 μsec., such is shown by a mark "X", and when larger than 0.20 μsec. (inclusive), a mark of "XX" is shown.

As is apparent from Table 2, in the case where the number of fine grooves having a depth larger than 0.2 μm and width of less than 40 μm was ten or less, no jitter was observed, and hence the resultant picture was satisfactory.

As described above, the invention provides a magnetic tape cassette having a guide pole which is in sliding contact with the magnetic surface of the tape contained in the cassette having properties ensuring that the magnetic tape has excellent running characteristics, preventing the occurrence of jitter and tape jamming and being relatively low in manufacturing cost.

What is claimed is:

1. A method for manufacturing a guide pole for a cassette tape, comprising the steps of: providing a cylindrical stainless steel base member; subjecting said base member to centerless grinding to roughen a surface of said base member; and subjecting said base member to barrel finishing using as an abrasive inorganic particles having a Moh's hardness of more than 9 to secure some of said particles to said finished surface.

2. The method of claim 1, wherein said step of centerless grinding is carried out with a grindstone having a roughness in a range of No. 100 to No. 140.

3. The method of claim 1, wherein said inorganic particles are made of aluminum oxide.

4. The method of claim 3, wherein a starting diameter of said aluminum oxide inorganic particles is in a range of 1 μm to 2 mm.

5. The method of claim 1, wherein said inorganic particles are made of silicon carbide.

* * * * *